United States Patent [19]

Murphy

[11] 4,289,559
[45] Sep. 15, 1981

[54] PROCESS AND APPARATUS FOR HEAT LAMINATING FILM TO A SUBSTRATE

[76] Inventor: Shirley D. Murphy, Rte. 6, Box 336A, New Bern, N.C. 28560

[21] Appl. No.: 85,878

[22] Filed: Oct. 18, 1979

[51] Int. Cl.³ .................................................. B44C 1/16
[52] U.S. Cl. ...................................... 156/238; 156/324; 156/344; 156/582; 156/583.3; 156/583.5; 428/914
[58] Field of Search ................ 156/234, 238, 324, 344, 156/582, 583.3, 583.5; 428/910, 914

[56] References Cited

U.S. PATENT DOCUMENTS

| | | | |
|---|---|---|---|
| 2,485,725 | 10/1949 | Francis | 156/238 X |
| 2,700,629 | 1/1955 | Townsend | 156/238 X |
| 3,316,137 | 4/1967 | Wisotzky | 156/324 X |
| 3,605,194 | 9/1971 | Nauta | 156/582 X |

Primary Examiner—John T. Goolkasian
Assistant Examiner—Robert A. Dawson
Attorney, Agent, or Firm—Shlesinger, Arkwright, Garvey & Dinsmore

[57] ABSTRACT

A process and apparatus for heat laminating a light gauge plastic film to a heavier substrate material. The film and substrate are fed between rotating laminating rolls, one of which is heated, the rolls being urged against each other under pressure. Prior to lamination, the substrate is positioned on a supporting surface of hard, flexible material in the form of an endless belt or sheet which passes between the rolls, or a smooth flexible sleeve secured to one of the laminating rolls. During lamination, the substrate adheres to the flexible supporting surface, and the substrate is maintained in engagement therewith for a predetermined time after lamination to permit the same to cool and stabilize in order to prevent the formation of ripples therein. The film may have a decorative coating applied to one face thereof, which is transferred to the substrate at the time of lamination and the film may be optionally peeled off the substrate leaving only the decorative coating applied to the substrate.

20 Claims, 9 Drawing Figures

PROCESS AND APPARATUS FOR HEAT LAMINATING FILM TO A SUBSTRATE

BACKGROUND OF THE INVENTION

In the heat lamination of light gauge plastic film to a heavier gauge substrate, it has been standard practice to employ a machine which consists basically of a framework in which two laminating rolls are mounted one above the other. The lower roll is rotatably mounted in the frame and will not move either vertically or horizontally with downward pressure as applied to it by the upper roll, which upper roll is vertically adjustable to lower the same to laminating position. The lower roll conventionally comprises a metal core covered with a layer of a resilient material, such as rubber or compounds having similar properties. The lower roll provides the surface against which lamination takes place when the upper roll is dropped under pressure on top of the two materials fed therebetween for lamination.

The upper roll is conventionally made of steel with a high polish and is mounted in the frame of the machine in a manner which permits it to be raised or lowered vertically by air or hydraulic pressure.

The heat necessary to produce lamination or fusion of the two materials is normally provided by the upper roll which is heated either internally or externally to the desired temperature. As the material passes between the rolls, heat is transferred from the surface of the upper roll through the light gauge plastic film into the substrate at the pinchpoint where the rolls meet, and this heats the two materials to a point where they fuse together. The surface temperature of the top of the upper roll is maintained by temperature-sensing units which feed additional heat to the upper roll as the surface temperature drops.

In the use of this type of equipment, it has been impossible up to the present time to prevent the formation of longitudinal ripples in the finished product after it leaves the laminating rolls. The presence of these ripples creates an unsatisfactory product which is not commercially acceptable for many uses, thereby resulting in serious losses in time and money to the manufacturer.

SUMMARY OF THE INVENTION

The present invention is a process and apparatus for heat laminating various types of light gauge plastic film to a heavy gauge substrate of plastic or other material, wherein lamination is effected without the formation of longitudinal ripples or other deformities which affect the acceptability of the laminated product.

In accordance with the process of the present invention, a thin plastic film is fed onto a thicker substrate, which substrate is supported on a smooth, hard, flexible member, following which the film and substrate are fed between laminating rolls which are mounted one above the other. One of the laminating rolls is heated and lowered under pressure against the other roll. The film is thereby laminated to the substrate at the pinchpoint between the two rolls. The laminate is maintained in engagement with the flexible supporting surface for a predetermined time until sufficient heat has dissipated from the substrate so that is will retain its shape and not be subject to surface deformation.

The smooth, hard, flexible member which supports the substrate may be integral with one of the laminating rolls, or may be separate therefrom. This supporting member may, therefore, comprise an endless belt made of a hard, flexible, metallic or non-metallic material, or a backing sheet of hard, flexible, metallic or non-metallic material, either of which is fed between the laminating rolls with the substrate and film. Alternatively, the supporting member may comprise a sleeve of hard, flexible, metallic or non-metallic material secured to one of the laminating rolls which supports the substrate prior to lamination and is maintained in engagement therewith for a predetermined period thereafter.

The film which is laminated to the substrate is preferably of plastic material, and may be clear, opaque or a clear film having a decorative coating applied to one surface thereof. In the case of the decorative film, when lamination occurs, the decorative coating on the film is transferred to the opposing face of the substrate, so that the film itself may be optionally peeled off the surface of the substrate or may be left laminated thereto to provide a protective surface.

DESCRIPTION OF FIGURES OF THE DRAWINGS

FIG. 4 is an end elevational view as viewed from 4—4 of FIG. 2;

DETAILED DESCRIPTION OF THE INVENTION

In FIGS. 1 to 4, there is illustrated one form of the apparatus of the present invention for laminating to a heavier gauge substrate, the apparatus illustrated being for the application of a decorative film to the substrate for use of the latter on the interior trim of motor vehicles or like purposes.

Figure 1:
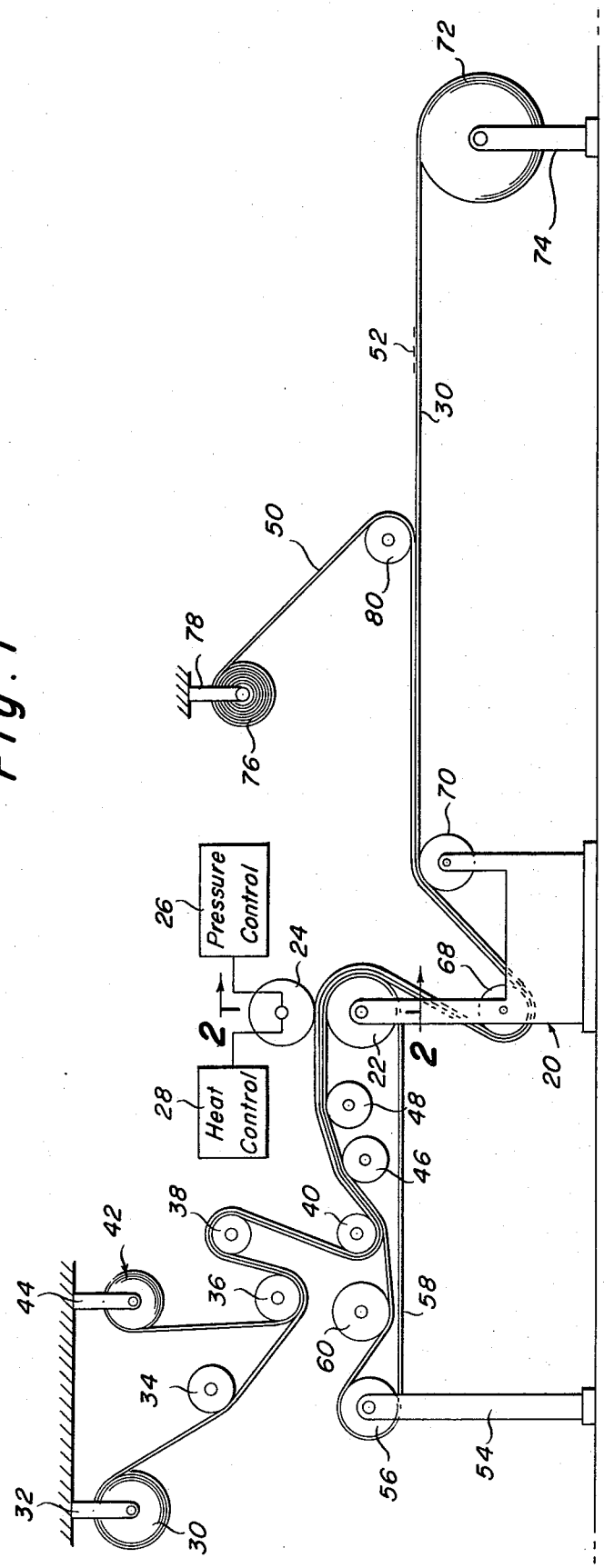
FIG. 1 is a side elevational view illustrating the apparatus of the present invention.

Referring to FIG. 1, there is provided a frame 20 which rotatably supports a lower laminating roll 22 which is disposed in a horizontal plane. Lower laminating roll 22 is of conventional construction including a metalcore, to the outer periphery of which is applied a resilient surface of rubber or material having similar resilient properties.

An upper laminating roll 24 is rotatably mounted above lower laminating roll 22 which upper roll is vertically movable by standard hydraulic or pneumatic pressure control means 26. Internal or external heating means for upper roll 24 is indicated at 28. Upper laminating roll 24 is also of standard construction and is preferably made of a polished steel material.

In accordance with the present invention, a roll 30 of a suitable substrate material such as ABS is rotatably mounted as indicated at 32 which substrate extends past, and is in engagement with, a series of idler pulleys 34, 36, 38 and 40 prior to passage between laminating rolls 22 and 24.

In like manner, a roll of light gauge film material 42 is rotatably mounted at 44, which film extends downwardly into engagement with idler 36, at which time it is in contiguous relation with substrate 30 and remains in engagement therewith past idler 38 and idler 40 prior to passage between laminating rolls 22 and 24. A pair of idler pulleys is indicated at 46 and 48, which pulleys are in supporting engagement with the lower face of the substrate prior to entry between the laminating rolls.

Figure 2:
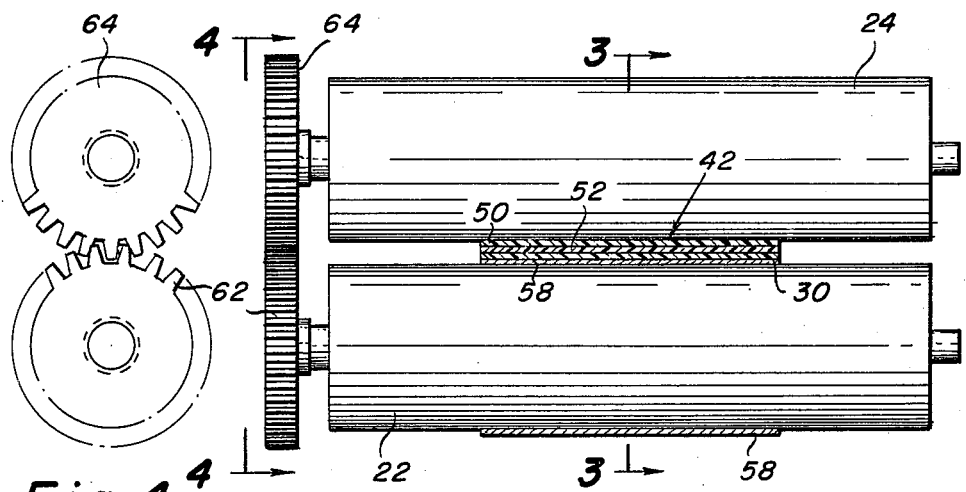
FIG. 2 is an enlarged sectional view taken along the line 2—2 of FIG. 1, looking in the direction of the arrows.
Figure 3:
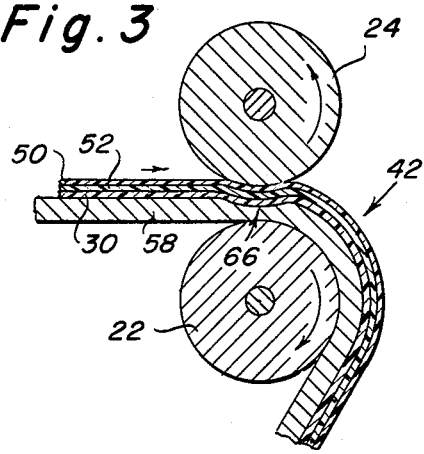
FIG. 3 is a sectional view taken along the line 3—3 of FIG. 2, looking in the direction of the arrows.

Film 42 may comprise a clear film, a film of a solid color or a film with a decorative pattern printed thereon. The drawings illustrate the use of a light gauge film comprising a clear plastic 50 having a decorative pattern 52, as shown in FIGS. 2 and 3. This type of film is of a conventional type and is used for applying a decorative pattern to a substrate for use in applications to the interior trim of motor vehicles or the like.

It is a salient feature of the present invention to provide, in conjunction with the film and substrate, a second frame member 54 which is in spaced relation to frame 20, and having a pulley 56 rotatably mounted thereon. A conveyor belt 58 is movably mounted between pulleys 56 and 22 which conveyor belt is made of a hard, smooth, flexible material such as one-eighth inch to three-sixteenth inch composition. A tensioning roller for conveyor belt 58 is indicated at 60.

It will be noted from FIGS. 2 and 4 that to synchronize the rotation of the rolls, there are provided a pair of mating gears 62 and 64 which are driven from a common source in conventional fashion. Also, the speed of movement of flexible conveyor belt 58 is synchronized with the rotation of gears 62 and 64 which control the rotational movement of laminating rolls 22 and 24 in order to effect smooth passage of the film and substrate between the laminating rolls.

It will be noted from FIG. 1 that substrate 30, with the film 42 in contiguous engagement with one face thereof, engages conveyor belt 58 just as the substrate and film pass pulley 40, so that the conveyor belt, substrate and film pass as a unit over pulleys 46 and 48.

As substrate 30 and film 42 pass between laminating rolls 22 and 24, heat control 26 is activated so that roll 24 is heated to a surface temperature of approximately 400°. Pressure control 26 is also activated to apply a pressure of approximately 55 p.s.i. to the materials to be laminated so that, as indicated in FIG. 3, a laminating groove 66 is formed in conveyor belt 58 at the pinchpoint between laminating rolls 22 and 24.

Due to the heat and pressure applied to film 42 and substrate 30, the two are laminated together into a single laminate, and the substrate adheres to the hard, flexible conveyor belt 58 in order to stabilize the substrate and prevent the formation of longitudinal ripples therein.

As the laminate passes out of the laminating groove, it is maintained in contact with conveyor belt 50 as shown in FIGS. 1 and 3 in order that the stability of the substrate may be maintained while the heat is dissipated therefrom. As the laminate is removed from engagement with conveyor belt 58, it is drawn downwardly past the idler pulley 68 which is rotatably mounted on frame 20. The laminate is then drawn upwardly past a second pulley 70 which is also mounted on frame 20.

In accordance with the present invention, the laminate may optionally be wound on a receiving drum 72 rotatably mounted on a stand 74, in those instances where it is desired to leave plastic film 50 on the laminate as a protective coating therefor.

However, during the lamination of the film to the substrate, decorative coating 52 is transferred from clear plastic 50 to the substrate and, if it is desired to remove the clear plastic film, this may be accomplished prior to winding of the laminate on drum 72.

As shown in FIG. 1, a drum 76 is suitably mounted at 78 above the laminate, and between pulley 70 and drum 72, which drum 76 is driven in order to peel the plastic film moving past idler pulley 80, and directed upwardly onto drum 76 which is driven synchronously with drum 72. As noted above, the decorative pattern formerly applied to the surface of the film, has been completely removed therefrom and transferred to the substrate, so that the resulting product which is wound on drum 72 consists of the substrate 30 with the decorative pattern 52 applied to the upper face thereof.

It should be noted that the stiff, flexible surface of conveyor belt 58 enables a laminating groove to be formed therein at the pinchpoint between laminating rolls 22 and 24, while, at the same time, providing a supporting surface or carrier to which the substrate will attach itself in order to prevent instability of the latter which heretofore has resulted in longitudinal ripples being formed in the finished product.

In conjunction with the supporting surface of the conveyor belt, the maintenance of engagement of the substrate therewith for a period following lamination, prevents instability of the substrate forming after lamination occurs, due to the heat retained by the substrate during the lamination process.

DESCRIPTION OF EMBODIMENT OF THE INVENTION ILLUSTRATED IN FIGS. 5 TO 8

In FIGS. 5 to 8 there is illustrated a modified form of the present invention, wherein instead of providing a conveyor belt in association with laminating rolls, there are provided a pair of laminating rolls including a lower roll 82 which is rotatably mounted on a stationary frame, above which is a vertically adjustable roll 84. Rolls 82 and 84 are synchronously driven in opposite directions by gears 86 and 88 respectively.

In accordance with this form of the invention, lower roll 82 preferably comprises a conventional laminating roll including a central metal core which is faced with a resilient surface 83. In accordance with the present invention, a tubular member 90 is in sleeved engagement with the outer surface of lower roll 82 and is fixed to the end walls of the roll by suitable means 92. Tubular member 90 is preferably of seamless construction, which member is made of a hard, smooth, flexible material which may be metallic or non-metallic. An aluminum or steel member in the range of 0.010 inch to 0.075 inch being effective. An aluminum tubular member of 0.050 inch has proven to give optimum results.

In accordance with this form of the invention, the film and substrate are fed from sources of supply, such as illustrated in the form of the invention as shown in FIG. 1 and, as the materials to be laminated are fed between rolls 82 and 84, a laminating groove 94 is formed at the pinchpoint between the two rolls and the lamination occurs upon application of heat and pressure to laminating roll 84 by any conventional suitable means, such as shown in the form of invention illustrated in FIGS. 1 to 4.

Tubular member 90 also provides a rigid supporting surface to which substrate 30 may adhere in order to stabilize the same during the laminating process, to prevent formation of longitudinal ripples in the surface thereof.

Figure 8:
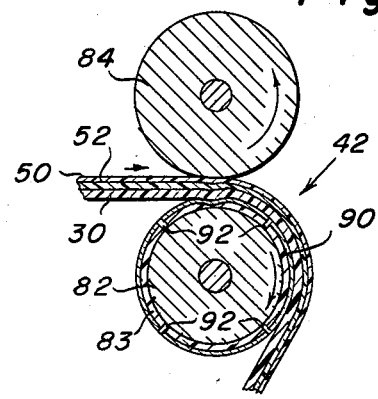
FIG. 8 is a side elevational view of the apparatus of the form of invention illustrated in FIGS. 5 to 7.
Figure 5:
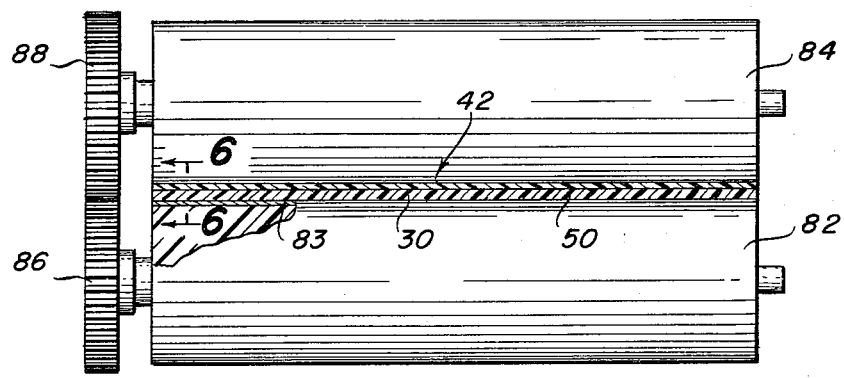
FIG. 5 is a view similar to FIG. 2, illustrating another embodiment of the present invention.
Figure 6:
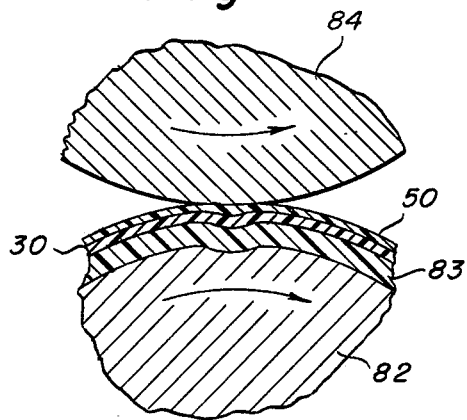
FIG. 6 is an enlarged sectional view taken along the line 6—6 of FIG. 5, looking in the direction of the arrows.
Figure 7:
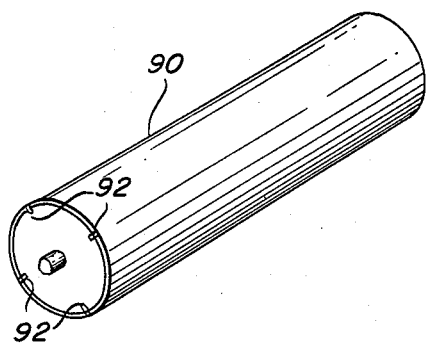
FIG. 7 is a perspective view of a laminating roll forming a part of the embodiment of the invention illustrated in FIGS. 5 and 6.

As shown in FIG. 8, the laminate is trained around a portion of the periphery of pulley 22 so that tubular member 90, to which the substrate is adhered, remains in supporting engagement with the laminate during the period when heat is being dissipated therefrom, in order to prevent instability of the substrate which would otherwise cause longitudinal rippling thereof. The laminate, therefore, is maintained in contact with the tubular member through an angle of 90° or more, following which it is wound on a drum in the manner of the form of invention illustrated in FIGS. 1 to 4.

DESCRIPTION OF EMBODIMENT OF THE INVENTION ILLUSTRATED IN FIG. 9

Figure 9:
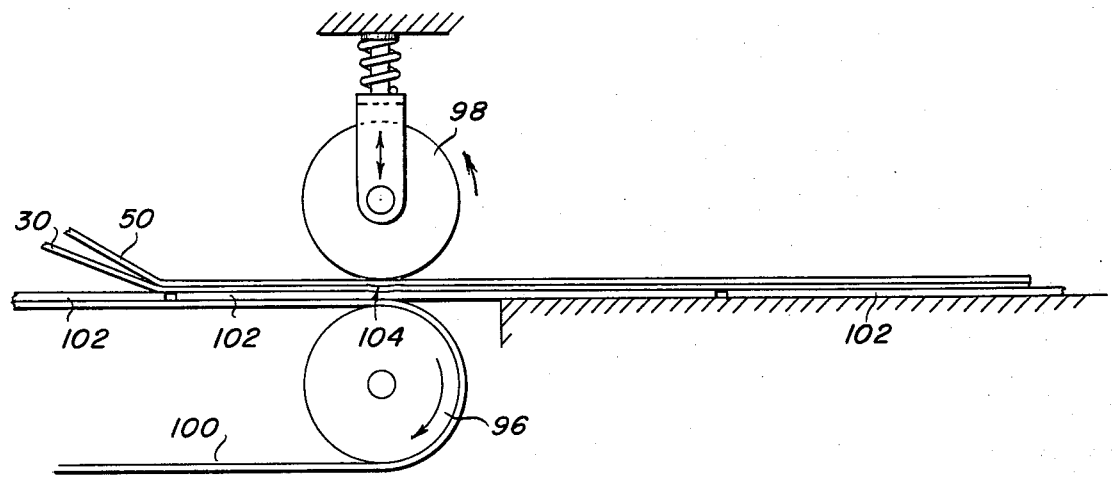
FIG. 9 is a side elevational view illustrating another embodiment of the present invention.

In FIG. 9 there is illustrated still another form of the invention wherein laminating rolls are indicated at 96 and 98, which are of the same structural arrangement and positioning as in the forms of the invention illustrated in FIGS. 1 to 8.

In this form of the invention, however, a conventional conveyor belt 100 is connected to, and operated synchronously with, laminated rolls 96 and 98, which conveyor belt is fed between said rolls. In connection with conveyor belt 100, there are provided a plurality of hard, smooth, flexible, flat plates 102 onto which substrate 30, having film 42 engaged therewith is positioned prior to passage between the laminating rolls. Plates 102 may be of metallic or non-metallic construction, aluminum, or steel plates having a thickness of 0.010 inch to 0.075 inch having been found to produce the desired result.

Just as in the forms of the invention illustrated in FIGS. 1 to 8, as the film and substrate pass between laminating rolls 96 and 98 under heat and pressure, a laminating groove 104 is formed in the flexible plate at the pinchpoint between rolls 96 and 98, to effect lamination of the film to the substrate and also adherence of the substrate to plate 102 in order to maintain stability of the former. In accordance with a salient feature of this invention, the laminate is maintained in adhering engagement with plate 102 until heat is partially dissipated from the substrate to stabilize the latter and prevent the formation of longitudinal ripples therein.

The process and apparatus of the present invention affords simple, but effective, steps and combination of elements for effectively eliminating the formation of longitudinal ripples in a substrate during the lamination thereof to the film, which process and apparatus can be readily incorporated in existing continuous line procedures.

The present process and apparatus further enables the optional removal of the clear plastic film carrying the decorative pattern from the substrate, after transfer of the decorative pattern to the substrate.

While there have been herein shown and described the presently preferred form of this invention, it is to be understood that such has been done for purposes of illustration only, and that various changes may be made therein within the scope of the appended claims.

What is claimed is:

1. A process for laminating a heat sensitive film to a substrate comprising the steps of
    (a) positioning the heat sensitive film on the upper surface of the substrate
    (b) placing the lower surface of the substrate on a hard, smooth, flexible supporting surface
    (c) applying heat and pressure to the heat sensitive film and substrate to a degree that a laminating groove is formed in the hard, smooth, flexible supporting surface, for receiving the film and substrate, in which groove the film and substrate are laminated together
    (d) removing the heat and pressure while maintaining the laminated material in engagement with the supporting surface until the heat is partially dissipated therefrom, and
    (e) disengaging the laminated material from the supporting surface.
2. The process of claim 1, wherein
    (a) said heat sensitive film and substrate are fed in a continuous operation between laminating rolls.
3. The process of claim 1, wherein
    (a) said heat sensitive film, substrate and supporting surface are fed at the same speed between rotating laminating rolls.
4. The process of claim 1, wherein
    (a) the film has a decorative face which is transferred to the substrate during lamination, and with the additional step of
    (b) peeling the film from the substrate after transfer of the decorative material to the substrate.
5. The process of claim 1, wherein
    (a) a pressure of approximately 55 p.s.i. is applied to the film, substrate and supporting surface to form the laminating groove in the latter.
6. Apparatus for laminating a heat sensitive film to a substrate, including
    (a) a pair of laminating rolls arranged in superjacent relationship and forming a nip therebetween.
    (b) a first means for heating one of said rolls
    (c) a second means for superimposing the heat sensitive film on one face of the substrate and feeding the film and substrate into the nip between said laminating rolls
    (d) a hard, flexible supporting surface engaged with the other face of the substrate prior to movement of the film and substrate into the nip between said laminating rolls, and
    (e) a third means for applying a predetermined pressure to said laminating rolls to form a laminating groove in said hard, flexible supporting surface as it passes between said laminating rolls
    (f) the film and substrate lying within said laminating groove during lamination to stabilize the same
    (g) the film and substrate remaining in engagement with said hard, flexible supporting surface for a predetermined period after lamination to permit dissipation of heat from the laminated film and substrate.
7. The apparatus of claim 6, wherein
    (a) said hard, flexible supporting surface is metallic.
8. The apparatus of claim 6, wherein
    (a) said hard, flexible supporting surface is non-metallic.
9. The apparatus of claim 6, wherein
    (a) said hard, flexible supporting surface is a tubular member in sleeved, fixed engagement with one of said laminating rolls.

10. The apparatus of claim 9, wherein
(a) said tubular member is seamless.
11. The apparatus of claim 6, wherein
(a) said hard, flexible supporting surface is a continuous belt of composition material in the range of 0.125 inch to 0.188 inch thick.
12. The apparatus of claim 6, wherein
(a) said hard, flexible supporting surface is a flat plate having a thickness of 0.010 inch to 0.075 inch.
13. Apparatus for laminating a heat sensitive film to a substrate, including
(a) a pair of laminating rolls arranged in superposed relationship and forming a nip therebetween
(b) a first means for heating one of said rolls
(c) a second means for superimposing the heat sensitive film on one face of the substrate and feeding the film and substrate into the nip between said laminating rolls
(d) the other of said laminating rolls having a resilient outer surface
(e) a tubular member of hard, smooth, flexible material sleeved over said unheated roll, and
(f) a third means for applying pressure to said laminating rolls to form a laminating groove in the periphery of said tubular member when the film and substrate pass between said rolls for lamination
(g) the film and substrate lying within the laminating groove and the substrate adhering to said tubular member to prevent formation of longitudinal ripples in the surface of the film and substrate during lamination.
14. The apparatus of claim 13, with the addition of
(a) a fourth means for maintaining the film and substrate in engagement with said tubular member after lamination to permit dissipating of heat from the laminated film and substrate, and prevent longitudinal rippling thereof.
15. The apparatus of claim 14, wherein
(a) the film and substrate laminate are maintained in contact with the periphery of said tubular member through an arc of at least 90°.
16. The apparatus of claim 13, wherein
(a) said tubular member is made of non-metallic material.
17. The apparatus of claim 13, wherein
(a) said tubular member is made of metallic material.
18. The apparatus of claim 17, wherein
(a) the wall thickness of said tubular member is in the range of 0.010 inch to 0.075 inch.
19. The apparatus of claim 18, wherein
(a) said tubular member is made of aluminum and has a wall thickness of approximately 0.050 inch.
20. The apparatus of claim 13, wherein
(a) said tubular member is seamless.

* * * * *